United States Patent [19]

Tanaka et al.

[11] Patent Number: 4,796,218
[45] Date of Patent: Jan. 3, 1989

[54] ARITHMETIC CIRCUIT CAPABLE OF EXECUTING FLOATING POINT OPERATION AND FIXED POINT OPERATION

[75] Inventors: Hideo Tanaka; Takao Nishitani, both of Tokyo, Japan

[73] Assignee: NEC Corporation, Tokyo, Japan

[21] Appl. No.: 16,036

[22] Filed: Feb. 18, 1987

[30] Foreign Application Priority Data

Feb. 18, 1986 [JP] Japan .................................. 61-34373

[51] Int. Cl.⁴ .............................................. G06F 7/38
[52] U.S. Cl. .................................................. 364/748
[58] Field of Search ....................... 364/736, 748, 715; 235/310

[56] References Cited

U.S. PATENT DOCUMENTS 4,511,990 4/1985 Hagiwara et al. .................. 364/748
4,562,553 12/1985 Mattedi et al. ...................... 364/745
4,719,589 1/1988 Tanaka ................................ 364/748

OTHER PUBLICATIONS

Smith et al., "Fixed, Floating-Point Adder", Technical Notes No.: 846, Aug. 20, 1969, pp. 1-3.

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

An arithmetic circuit comprises a pair of input registers for holding a pair of given numbers, and a radix point adjustment circuit coupled to the input registers for aligning the radix points of the given numbers. This adjsutment circuit is capable of outputting at least a pair of radix point aligned fractions and one exponent derived from the radix point alignment. An arithmetic operation circuit receives the pair of the radix point aligned fractions, and outputs the result of a given arithmetic operation of the received fractions and generates an overflow signal when an overflow is generated in the arithmetic operation of the received fractions. An exponent correction circuit receives the exponent from the adjustment circuit, and is responsive to the overflow signal from the arithmetic operation circuit so as to selectively correct the received exponent. A fraction correction circuit receives the output of the arithmetic operation circuit so as to correct the received data. There is provided a first selector receiving the output of the exponent correction circuit and responsive to a given control signal so as to selectively output the output of the exponent correction circuit or a predetermined value. Further, a second selector is provided to receive the outputs of the arithmetic operation circuit and the fraction correction circuit so as to selectively output one of the two received fractions in response to the control signal.

6 Claims, 3 Drawing Sheets

ARITHMETIC CIRCUIT CAPABLE OF EXECUTING FLOATING POINT OPERATION AND FIXED POINT OPERATION

BACKGROUND OF THE INVENTION

1. Field of the Invention

The present invention relates to an arithmetic operation circuit, and more particularly to an arithmetic circuit capable of executing both of a floating point arithmetic operation and a fixed point arithmetic operation.

2. Description of Related Art

One-chip integrated electronic circuits such as one-chip microcomputers which can perform arithmetic operation are demanded to be capable of executing a complicated operation such as a floating point arithmetic operation with an increasing scale of integrated circuits. The floating point arithmetic operation is widely utilized mainly for the purpose of extending the range of numerical data representable with a limited number of bits, and for the purpose of automatically correcting an overflow resulting from an arithmetic operation.

In the floating point arithmetic operation, a numerical data is expressed by the exponent and the fraction or mantissa, and the exponent and the fraction of given numerical data is separately processed.

Accordingly, a conventional typical floating point arithmetic circuit comprises a pair of input registers adapted to temporarily hold a pair of given floating point representation numbers to be operated, respectively. The pair of numbers stored in the pair of registers are fed to a radix point adjustment circuit so that the radix points of the given numbers are aligned when addition or subtraction should be executed. In other words, the pair of given floating point numbers are converted into another pair of floating point numbers which have the same value in their respective exponent portions but still represent the same numbers as those indicated by the original given floating point numbers, respectively.

The respective fraction portions of the thus obtained floating point numbers having the same value of exponent are inputted to a pair of input ports of a fraction operating circuit. This fraction operating circuit outputs the result of a given arithmetic operation of the inputted fraction numbers to a fraction correction circuit, and generates an overflow signal when an overflow occurs as the result of the arithmetic operation. The fraction correction circuit outputs the input fraction number as it is to a fraction portion of an output register when the overflow signal is not generated. But, when the overflow signal is generated, the fraction correction circuit right-shifts the input fraction number by one bit, and outputs the one-bit shifted fraction number to the output register.

The floating point arithmetic circuit also includes an exponent correction circuit adapted to receive the data of the exponent portion from the adjustment circuit. The exponent correction circuit outputs the received exponent data as it is to an exponent portion of the output register when the overflow signal is not generated by the fraction operating circuit. But, when the overflow signal is generated, the exponent correction circuit adds "1" to the received exponent data and outputs the "1"-plused exponent data to the exponent portion of the output register.

In the arithmetic operation, however, not only floating point numbers are used, but also fixed point numbers are often to be operated, particularly in a signal processing frequently executing numerical data computation. In such a case, it is desired that not only floating point numbers but also fix point numbers can be processed in the same one device, microcomputer, and processor.

When the fixed point data is processed, the result of the arithmetic operation is outputted as it is without being corrected by an overflow resulting from the arithmetic operation. In the conventional floating point arithmetic circuit as described hereinbefore, however, when an overflow occurs from the arithmetic operation of fractions of the given numbers, the result of the arithmetic operation will be corrected without exception. In other words, the conventional floating point arithmetic cannot be used for the arithmetic operation of fixed point data.

SUMMARY OF THE INVENTION

Accordingly, it is an object of the present invention is to provide an arithmetic circuit capable of processing both of floating point data and fixed point data.

Another object of the present invention is to provide an arithmetic circuit capable of executing both of a floating point arithmetic operation and a fixed point arithmetic operation, without substantial increase of circuit elements in comparison with the conventional floating point arithmetic circuit, so that it can be easily incorporated in a one-chip device.

The above and other objects of the present invention are achieved in accordance with the present invention by an arithmetic circuit comprising a pair of input registers for holding a pair of given numbers, a radix point adjustment circuit coupled to the input registers for aligning the radix points of the given numbers, the adjustment circuit being capable of outputting at least a pair of radix point aligned fractions and one exponent derived from the radix point alignment, an arithmetic operation circuit receiving the pair of the radix point aligned fractions so as to output the result of a given arithmetic operation of the received fractions and to generate an overflow signal when an overflow is generated in the arithmetic operation of the received fractions, an exponent correction circuit receiving the exponent from the adjustment circuit and responsive to the overflow signal from the arithmetic operation circuit so as to selectively correct the received exponent, a fraction correction circuit receiving the output of the arithmetic operation circuit so as to correct the received data, a first selector receiving the output of the exponent correction circuit and responsive to a mode selection signal so as to selectively output the output of the exponent correction circuit or a predetermined value, and a second selector receiving the outputs of the arithmetic operation circuit and the fraction correction circuit and responsive to the mode selection signal so as to selectively output one of the two received fractions.

With the above arrangement, either the output of the arithmetic operation circuit or the output of the fraction correction circuit is selectively outputted by the second selector in accordance with the control signal. The output of the fraction correction circuit represents the fraction number which has already been corrected, similarly to a floating point arithmetic operation in the case of a overflow occurrence. On the other hand, the output of the arithmetic operation circuit represents the result of the fixed point arithmetic operation. Accordingly, the second selector selectively outputs the result of the fixed point arithmetic operation or the result in fraction portion of the floating point arithmetic operation. Similarly, the first selector selectively outputs the predetermined value which could be used in the fixed point arithmetic operation, or the output of the exponent correction circuit which has been corrected if it is necessary in accordance with the overflow signal. Thus, the above arithmetic circuit can selectively output the result of the floating point arithmetic operation or the result of the fixed point arithmetic operation.

The above and other objects, features and advantages of the present invention will be apparent from the following description of preferred embodiments of the invention with reference to the accompanying drawings.

DESCRIPTION OF THE PREFERRED EMBODIMENTS

Figure 1:
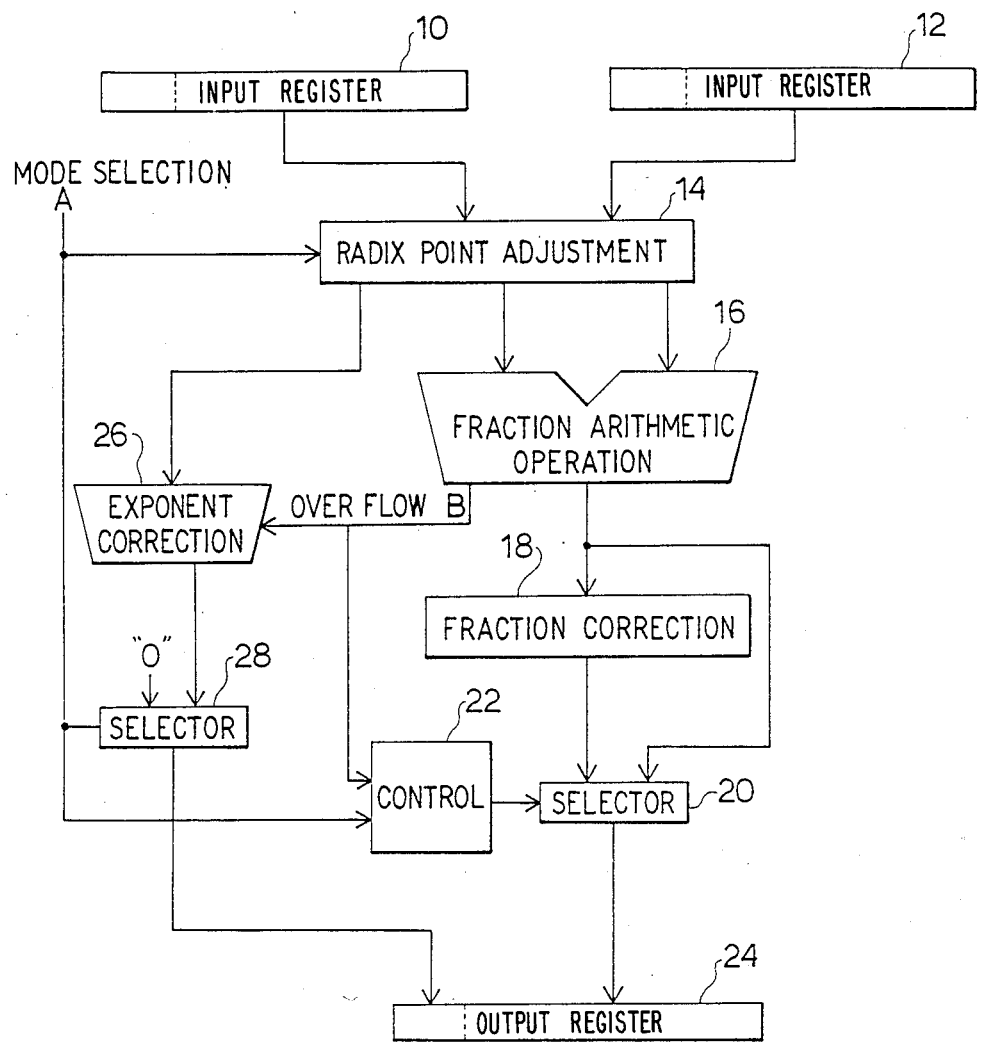
FIG. 1 is a block diagram of one embodiment of the arithmetic circuit in accordance with the present invention.

Referring to FIG. 1, an arithmetic circuit constructed in accordance with the present invention comprises a pair of input registers 10 and 12 adapted to temporarily hold a pair of given floating point representation numbers to be operated, respectively. Each of the registers 10 and 12 has at least an exponent portion for registering the exponent of the given number, and a fraction portion for registering the fraction of the given number. The pair of registers 10 and 12 are coupled to a radix point adjustment circuit 14 controlled by a mode selection signal A, so that the radix points of the given numbers are aligned when addition or subtraction should be executed in a floating point operation mode. In other words, the pair of given floating point numbers are converted into another pair of floating point numbers which have the same value in their respective exponent portions but still represent the same numbers so those indicated by the original given floating point numbers, respectively. Therefore, the radix point adjustment circuit 14 has at least a pair of fraction outputs and one exponent output.

The pair of fraction outputs of the adjustment circuit 14 are coupled to a pair of input ports of a fraction arithmetic operation circuit 16. This fraction operation circuit 16 outputs the result of a given arithmetic operation of the inputted fraction numbers to a fraction correction circuit 18, and generates an active overflow signal B when an overflow occurs as the result of the arithmetic operation. The fraction correction circuit 18 right-shifts the input fraction number by one bit, and outputs the one-bit shifted fraction number to one input of a selector 20. This selector 20 is adapted to receive at its other input the fraction output of the arithmetic operation circuit 16. The selector 20 is controlled by a control circuit 22 so as to output either the output of the arithmetic operation circuit 16 or the output of the correction circuit 18 to a fraction portion of an output register 24. The control circuit 22 is connected to receive the mode selection signal A and the overflow signal B, and operates to cause the selector 20 to output the output of the correction circuit 18 to the output register 24 when the mode selection signal A is indicative of a floating point arithmetic operation and when the overflow signal B becomes active so as to show occurrence of an overflow. Otherwise, the control circuit 22 causes the selector 20 to select the fraction output of the arithmetic operation circuit 16.

The shown arithmetic circuit also includes an exponent correction circuit 26 adapted to receive the data of the exponent portion from the adjustment circuit 14. The exponent correction circuit 26 outputs the received exponent data as it is to one input of a second selector 28 when the overflow signal B is not made active by the fraction operating circuit 16. But, when the overflow signal B is made active, the exponent correction circuit 26 adds "1" to the received exponent data and outputs the "1"-plused exponent data to the selector 28. This selector 28 is adapted to receive "0" at its second input, and is controlled by the mode selection signal A so as to output the output of the correction circuit 26 to an exponent portion of the output register 24 when the mode selection signal A is indicative of the floating point arithmetic operation. On the contrary, if the mode selection signal A indicates the fixed point arithmetic operation, the selector 28 selects the "0" input.

If the mode selection signal A is indicative of the floating point operation, the pair of floating point representation numbers stored in the input registers 10 and 12 are inputted to the adjustment circuit 14 where the radix points of the two inputted numbers are aligned in the case of addition or subtraction. Fractions of the pair of radix point aligned numbers are fed to the arithmetic operation circuit 16 where designated arithmetic operation is executed between the two inputted fraction numbers. If an overflow occurs in this arithmetic operation, the overflow signal B is made active. On the other hand, the exponent data of the radix point aligned numbers is fed from the adjustment circuit 14 to the exponent correction circuit 26. If the overflow signal B is active, the correction circuit 26 adds "1" to the input exponent data and outputs the "1"-added exponent data to the selector 28. On the other hand, if the overflow signal B is not active, the correction circuit 26 outputs the input exponent data as it is to the selector 28. At this time, since the mode selection signal A is indicative of the floating point operation, the selector 28 outputs the exponent data received from the correction circuit 26, to the output register 24.

The fraction data outputted from the arithmetic operation circuit 16 is right-shifted one bit by the connection circuit 18 and then fed to the selector 20. Further, the fraction data outputted from the arithmetic operation circuit is fed directly to the selector 20.

The control circuit 22 associated to the selector 20 operates to control the selector 20 in accordance with the overflow signal B when the mode selection signal A is indicative of the floating point operation. Therefore, if the overflow signal B is made active by the arithmetic operation circuit 16, the control circuit 22 causes the selector 20 to output the output of the correction circuit 18 to the output register 24. But, if the overflow signal B is not made active, the control circuit 22 causes the selector 20 to output the output of the arithmetic operation circuit 16 to the output register 24.

When the mode selection signal A is indicative of the fixed point operation, the radix point adjustment circuit 14 is controlled by the mode selection signal A so that the exponent portions of the numbers stored in the input registers 10 and 12 are ignored, and therefore, the fraction portions are outputted without radix point alignment to the arithmetic operation circuit 16. As a result, a given arithmetic operation is performed between the pair of given numbers in the arithmetic operation circuit 16. The result of the arithmetic operation is fed directly to the one input of the selector 20 on one hand and right-shifted one bit by the correction circuit 18 on the other hand so that the one-bit shifted fraction data is inputted to the other input of the selector 20.

When the mode selection signal A is indicative of the fixed point operation, the control circuit 22 operates to cause the selector 20 to output the output of the arithmetic operation circuit 16 directly to the output register 24 without regard to the status of the overflow signal B. In addition, the selector 28 is controlled by the mode selection signal B indicative of the fixed point operation, so that the "0" input is fed to the exponent portion of the output register 24. As a result, all bits of the exponent portion of the output register 24 are forcedly brought to "0", so that the result of the fixed point operation is not influenced.

For example, assume that the arithmetic circuit as mentioned above can process a floating point data including an exponent portion of 8 bits and a fraction portion of 24 bits. The result of the fixed point operation is put in the 24-bit fraction portion of the output register, and the exponent portion of 8 bits is forcedly rendered "0". Therefore, the content of the exponent portion of the input data will not give any effect to the result of the fixed point operation. Thus, the fixed point operation can be executed by using the fraction arithmetic operation circuit 16 of the floating point arithmetic circuit.

Figure 2:
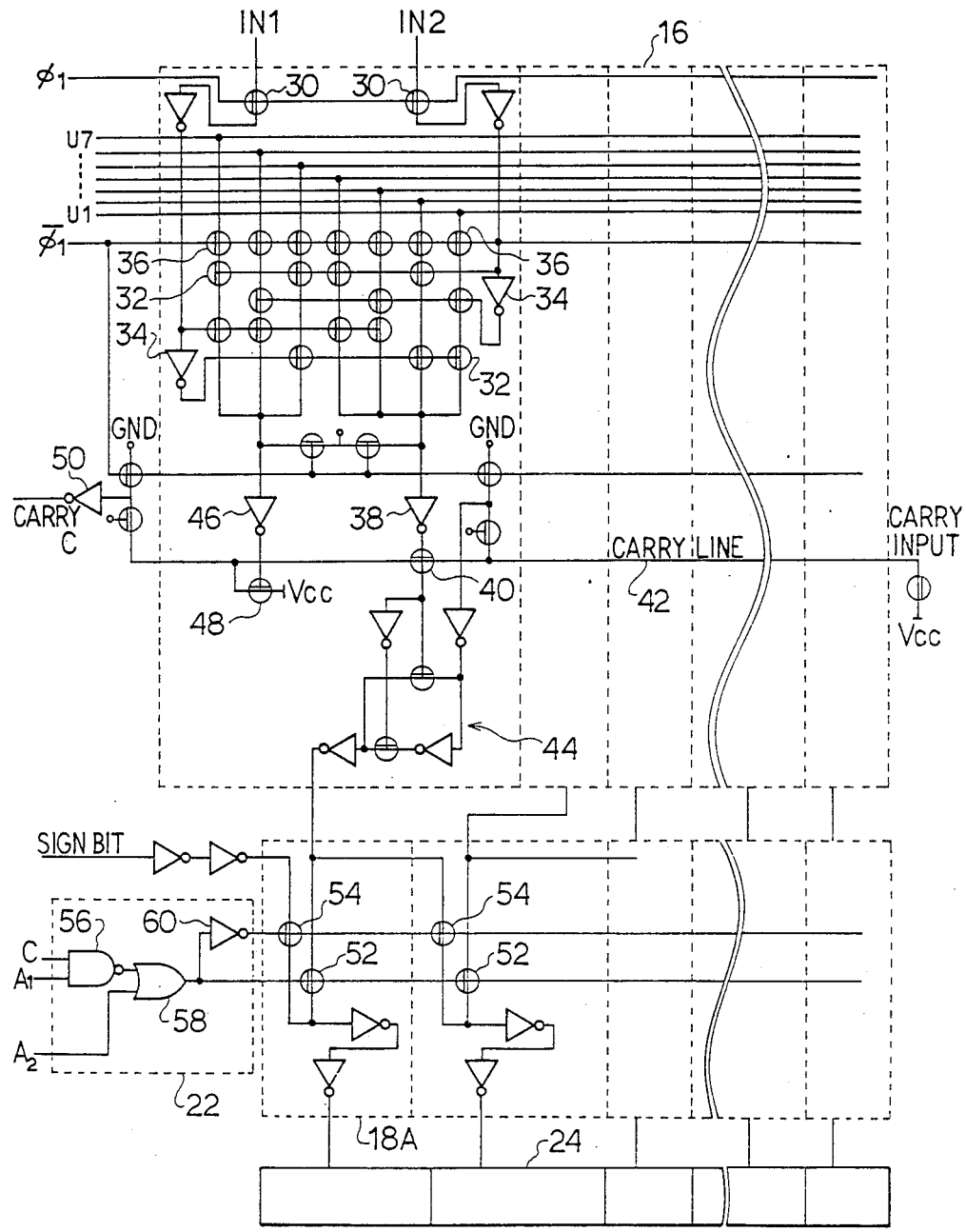
FIGS. 2 and 3 are detailed circuit diagrams of different portions of the circuit shown in FIG. 1.

Referring to FIG. 2, there is shown a detailed circuit of the fraction arithmetic operation circuit 16, the associated correction circuit 18, the selector 20 and the control circuit 22 shown in FIG. 1. The shown arithmetic operation circuit 16 is a 46-bits arithmetic unit, but only a unitary circuit for the most significant bit (MSB) is shown in detail because unitary circuits for respective bits are substantially the same. A pair of MSB input bits $IN_1$ and $IN_2$ are inputted through a pair of transfer gates 30, which are turned on in response to a clock $\phi$. The pair of input bits $IN_1$ and $IN_2$ are processed in a unitary arithmetic circuit including an array of switching gates 32 and inverters 34 connected as shown in FIG. 2. The switching gates 32 are selectively applied with operation type selection signals $U_1$ to $U_7$ through an array of transfer gates 36 which are turned on in response to another clock $\phi$. Therefore, the input bits is inputted in response to the clock $\overline{\phi}$ and an arithmetic operation designated by an active signal of the operation type selection signals $U_1$ to $U_7$ is executed in response to the clock $\overline{\phi}$.

A pair of signals are generated as the result of the executed arithmetic operation. One of the signal thus generated is fed through an inverter 38 to a transfer gate 40 inserted in a precharged carry line 42 and also to an output circuit 44. An output of the output circuit 44 is connected to a corresponding unitary circuit of a correction circuit and selector 18A. The other signal of the signal pair generated by the array of switching gates 32 is fed through an inverter 46 to a switching gate 48 connected between the carry line 42 and $V_{ss}$. the carry line 42 is connected through a fixed biased transfer gate to an inverter 50, which generates a carry signal C.

Each unitary circuit of the correction circuit and selector 18A has a pair of transfer gates, one of which 52 is connected at its end to the output of the corresponding unitary arithmetic circuit. In the unitary correction circuit and selector for the MSB bit, the other transfer gate 54 is connected to receive at its end a SIGN bit. In the other unitary circuit and selectors, the other transfer gate 54 is connected to the output of the unitary arithmetic circuit leftwardly adjacent to the corresponding unitary arithmetic circuit. The other ends of each transfer gate pair 52 and 54 are common-connected to a corresponding bit of the fraction portion of the output register 24. Each pair of transfer gates 52 and 54 are alternatively turned on by the control circuit 22. Thus, when the gate 52 is turned on and the gate 54 is off, the data outputted from the arithmetic circuit 16 is inputted to the output register 24 without any shift. On the other hand, when the gate 54 is turned on and the gate 52 is off, the output of the arithmetic circuit 16 is shifted one bit rightwardly, and the shifted data is registered in the output register 24.

The control circuit 22 includes a NAND circuit 56 having a first input connected to receive the carry signal C and a second input connected to receive a first mode selection signal $A_1$. An output of the NAND gate 56 is connected to one input of an OR gate 58, whose other input is connected to receive a second mode selection signal $A_2$. An output of the OR gate 58 is connected to the control gate of the transfer gate 52, and also through an inverter 60 to the control gate of the transfer gate 54. When the fixed point operation is selected, the first and second mode selection signals $A_1$ and $A_2$ are "0" and "1", respectively, and when the floating point operation is selected, the signals $A_1$ and $A_2$ are "0" and "1" (fixed point operation), the output of the OR gate 58 is made active, so that the gates 52 are turned on. But, when $A_1$ and $A_2$ are "1" and "0" (floating point operation) the OR gate 58 selectively assumes "1" or "0" in accordance with the carry signal C.

Figure 3:
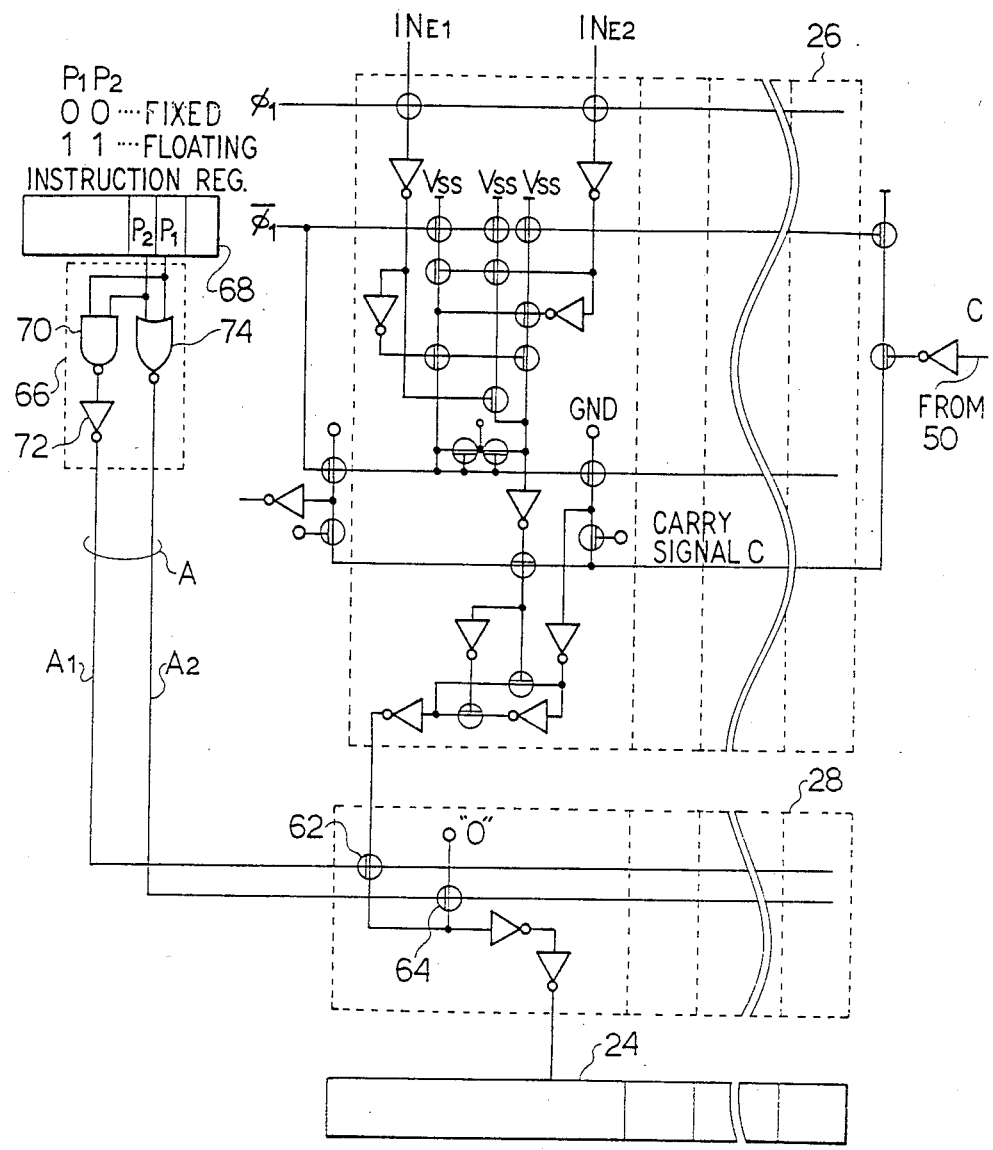

Turning to FIG. 3, there is shown a detailed circuit diagram of the component correction circuit 26 and the selector 28. The correction circuit 26 comprises a plurality of unitary circuits of the same structure, and the selector 28 comprises a plurality of unitary circuits of the same structure. Therefore, only respective unitary circuits for the most significant bit are shown in detail.

The shown exponent correction circuit 26 is composed of an arithmetic and logic unit so that it is possible to execute an arithmetic operation between a pair of exponent data. Therefore, the correction circuit 26 has a circuit structure similar to that of the arithmetic circuit 16, and so, a detailed explanation will be omitted. When the exponent data is corrected, one of inputs $IN_{E1}$ and $IN_{E2}$ is applied with the exponent data, and the other input is fixed to "0", so that "1"-plused data is generated in response to the carry signal C.

An output of each unitary exponent correction circuit is connected to a corresponding unitary circuit of the selector 28, which includes a first transfer gate 62 connected at its one end to the output of the unitary exponent correction circuit and at its other end to corresponding bit of the exponent portion of the output register 24. Further, the unitary selector circuit includes another transfer gate 64 connected between a logic level "0" and the other end of the gate 62. The first and second mode selection signals $A_1$ and $A_2$ in opposite phase to each other are supplied to control gates of the transfer gates 62 and 64, respectively. Thus, when $A_1$ and $A_2$ are "0" and "1", respectively (fixed point operation), the gate 64 is turned on, so that "0" is registered in all bits of the exponent portion of the output register 24. But, when $A_1$ and $A_2$ are "1" and "0" (floating point operation), the gate 62 is turned on, so that the output of the exponent correction circuit 26 is registered in the exponent portion of the output register 24.

Finally, the mode signals $A_1$ and $A_2$ are generated by a decoder 66 on the basis of a pair of predetermined bits $P_1$ and $P_2$ in an instruction register 68 of a one-chip microcomputer. The decoder 66 includes a NAND gate 70 having two inputs connected to the two bit $P_1$ and $P_2$ of the instruction register 68. An output of the NAND gate 70 is connected to an inverter 72, which generates the first mode selection signal $A_1$. The decoder 66 also has a NOR circuit 74 having two inputs connected to the bits $P_1$ and $P_2$ of the instruction register 68, so that the NOR circuit 74 generates at its output the second mode selection signal $A_2$ in opposite phase to the first mode selection signal $A_1$. Thus, when $P_1$ and $P_2$ are "0" and "0", $A_1$ and $A_2$ become "0" and "1" (fixed point operation). If $P_1$ and $P_2$ are "1" and "1", $A_1$ and $A_2$ become "1" and "0" (floating point operation).

Incidentally, in FIGS. 2 and 3, small-circle ends of various lines means "grounded" ("0" level), and orthogonal short-line ends of the various lines means "potential $V_{ss}$" ("1" level).

The invention has thus been shown and described with reference to specific embodiments. However, it should be noted that the invention is in no way limited to the details of the illustrated structures but changes and modifications may be made within the scope of the appended claims.

We claim:

1. An arithmetic circuit capable of selectively executing both a floating-point operation and a fixed-point operation, comprising;
    a pair of input registers for holding a given pair of numbers in a floating-point format or in a fixed-point format,
    a radix point adjustment circuit coupled to the input registers for aligning the radix points of the given pair of numbers, the adjustment circuit being capable of outputting a pair of radix point aligned fractions and one exponent derived from the radix point alignment,
    an arithmetic operation circuit receiving the pair of the radix point aligned fractions so as to output the result of a given arithmetic operation of the received fractions and to generate an overflow signal when an overflow is generated in the arithmetic operation of the received fractions,
    an exponent correction circuit receiving the exponent from the adjustment circuit and responsive to the overflow signal from the arithmetic operation circuit so as to selectively correct the received exponent,
    a fraction correction circuit receiving the output of the arithmetic operation circuit so as to correct the received data,
    a first selector receiving the output of the exponent correction circuit and responsive to a mode selection signal so as to selectively output the output of the exponent correction circuit or a predetermined value, and
    a second selector receiving the outputs of the arithmetic operation circuit and the fraction correction circuit and responsive to the mode selection signal so as to selectively output one of the two received fractions.

2. A circuit as claimed in claim 1 further including a decoder connected to receive at least one bit of an instruction register for generating the mode selection signal.

3. A circuit as claimed in claim 1 further including a control circuit receiving the mode selection signal and the overflow signal for controlling the second selector, so that the second selector outputs the output of the fraction correction circuit when the mode selection signal is indicative of the floating-point operation and when the overflow signal indicates occurrence of an overflow, and the second selector outputs the output of the arithmetic operation circuit when the mode selection signal is indicative of the floating-point operation but the overflow signal does not indicate occurrence of an overflow or when the mode selection signal is indicative of the fixed-point operation.

4. A circuit claimed in claim 3 wherein the first selector includes an array of unitary transfer circuits, each of which includes a pair of first and second transfer gates coupled at one ends thereof to a corresponding bit of an exponent portion of the output register, the first transfer gate of each pair being coupled at the other end thereof to a corresponding bit output of the exponent correction circuit, the second transfer gate of each pair being coupled to receive a logic level "0" at the other end thereof, each pair of the transfer gates being alternatively turned on.

5. A circuit claimed in claim 1 wherein the fraction correction circuit and the second selector are composed of an array of unitary transfer circuits, each of which includes a pair of first and second transfer gates coupled at one end thereof to a corresponding bit of a fraction portion of the output register, the first transfer gate of each pair being coupled at the other end thereof to a corresponding bit output of the fraction arithmetic operation circuit, the second transfer gate of each pair being coupled at the other end thereof to a bit output of the fraction arithmetic operation circuit leftwardly adjacent to the corresponding bit output of the fraction arithmetic operation circuit, each pair of the transfer gates being alternatively turned on.

6. A circuit as claimed in claim 5 further including a decoder for generating a pair of first and second mode selection signals in opposite phase to each other and a control circuit receiving the overflow signal and the first and second mode selection signals for controlling each pair of first and second transfer gates, so that the first transfer gate of each pair is turned off and the second transfer gate is turned on when the mode selection signal is indicative of a floating point operation and when the overflow signal indicates occurrence of an overflow, and the first and second transfer gates are on and off, respectively, when the mode selection signal is indicative of the floating-point operation but the overflow signal does not indicate occurrence of an overflow or when the mode selection signal is indicative of the fixed-point operation.

* * * * *